June 26, 1945.   E. ANDERSON   2,378,891
WORM GEARING
Filed Nov. 17, 1943

INVENTOR.
Emil Anderson
BY Thomas C. Betts
his ATTORNEY.

Patented June 26, 1945

2,378,891

UNITED STATES PATENT OFFICE 2,378,891

WORM GEARING

Emil Anderson, Briarcliff Manor, N. Y., assignor to Electrolux Corporation, Old Greenwich, Conn., a corporation of Delaware Application November 17, 1943, Serial No. 510,578

15 Claims. (Cl. 74—458)

My invention relates generally to gearing and more specifically to improvements in worm gearing suitable for continuous rotation.

Gearing of this type, as heretofore known, has involved sliding friction between the spiral thread on the worm and the teeth on the worm gear. This has resulted in a comparatively low efficiency and rapid wear and has required reliable lubricating systems and expensive lubricants.

It has also been known to provide worm gearing, particularly for use in automobile steering mechanisms, in which the member cooperating with the worm carries a single roller having one or two teeth thereon. However, such gearing is not capable of continuous rotation in one direction, inasmuch as the tooth, or at most the pair of teeth, would run out of mesh with the worm when the former is turned further than a fraction of a revolution.

In accordance with the present invention, I provide a worm gear having a plurality of roller teeth mounted around its entire circumference so that the gear may rotate continuously in one direction. One of the objects of my invention is to so mount the teeth in the gear that at least two rollers may engage the worm at the same time. Another object of my invention is to so arrange the rollers that the load applied to a roller which is in engagement with the worm may be distributed to other rollers which are not in such engagement. A further object of my invention is to provide means whereby each roller is brought up to approximately the proper speed of rotation before it engages the worm.

Further objects and advantages of my invention will be apparent from the following description considered in connection with the accompanying drawing which forms a part of this specification and of which:

Figure 1:
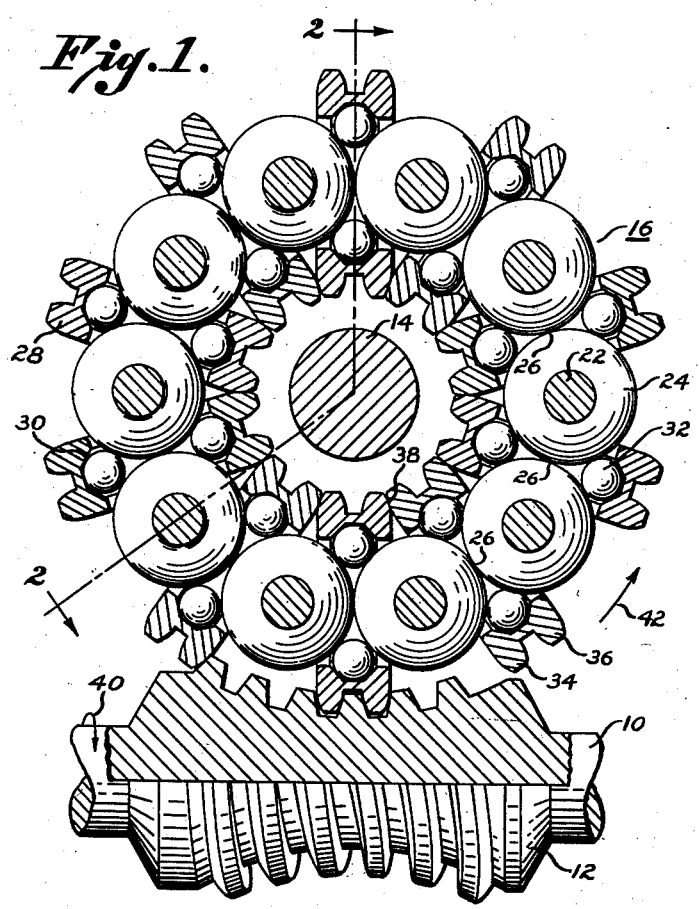
Fig. 1 is a cross-sectional view taken through the center line of the worm.
Figure 2:
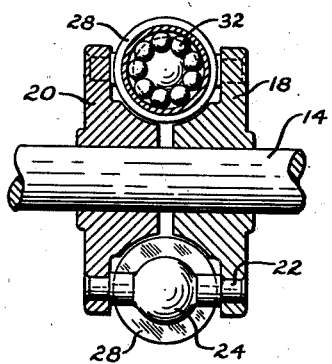
Fig. 2 is a cross-sectional view on a reduced scale taken on the line 2—2 of Fig. 1.

Referring more particularly to the drawing, reference character 10 designates a shaft carrying a worm 12. As shown, the worm is cut directly in the shaft but obviously it could be a separate member keyed or otherwise suitably fixed to the shaft. The worm is of the conventional Hindley, Cone or hourglass type in which the diameter of the pitch circle increases from the center of the worm towards both ends.

Reference character 14 designates a shaft disposed at substantially right angles to the shaft 10, on which is mounted the worm gear designated generally by reference character 16. The worm gear comprises a pair of hub members 18 and 20 which are suitably fixed to the shaft 14. Extending between the members 18 and 20 is a plurality of pins 22 which are riveted or otherwise suitably secured to each of the hub members so as to retain these members in a fixed spaced relationship with each other. Each pin is formed with a central spherical portion 24. The parts are so dimensioned that the spherical portions of adjacent pins are in tangential contact at the points 26, shown in Fig. 1.

Rotatably mounted between each pair of adjacent spherical portions 24 is an annular roller member 28. The inner surface of each roller is formed as a ball bearing race 30 within which are retained a plurality of balls 32 which roll within this race and against the spherical surfaces of the adjacent spherical portions 24. The outer surface of each roller is formed as a pair of gear teeth 34 and 36. The outer face of each tooth 34 is in rolling contact with the outer face of adjacent tooth 36 at the points 38 in Fig. 1.

The above-described device operates as follows:

Assuming that the shaft 10 rotates in the direction of the arrow 40 in Fig. 1, the helical thread on the worm 12 bears against the left faces of the teeth 34 and 36 on the roller 28 which is shown in the lowermost position, thus causing the worm wheel 16 to rotate in the direction of the arrow 42. The tooth pressure is applied in a direction substantially normal to the center plane of the roller and is transmitted through the balls 32 to the spherical portions 24 of the pins 22. The greater part of this force will be transmitted through the balls in the outer half of the race to the spherical member 24 which is to the right of the roller which is engaged by the worm. However, this force tends to tilt the roller, which tilting is prevented by the transmission of force through the balls in the inner half of the race to the spherical member located to the left of the roller in question. From each of these spherical portions the force is transmitted to the hub members 18 and 20 through the pins 22. However, the individual pin which is integral with the spherical portion under load at any instant does not have to transmit all of this load to the hub members due to the fact that adjacent spherical portions are in tangential contact at points 26 and consequently the load is distributed among several pins.

As the worm 12 turns, the rollers 28 rotate with it about the ball bearings 32, but in opposite direction and consequently there is rolling friction between the thread on the worm and the teeth on the rollers, rather than sliding friction which is present in all conventional types of worm gearing. Moreover, due to the rolling contact between the adjacent rollers at the point 38, rotation of the roller which is in engagement with the worm imparts rotation to the adjacent roller which is about to enter the worm. Consequently, such entering roller is rotating at substantially the same peripheral speed as is the worm when it engages the latter. In this connection it will be noted that the thrust resulting from the tooth pressure on the roller which is in engagement with the worm is in such a direction as to increase the contact pressure between this roller and the entering roller, and to decrease the contact pressure between the roller which is in engagement and the roller which has just passed out of engagement with the worm.

Due to the absence of sliding friction between the worm and the teeth on the worm gear, it is possible to make both of these elements of hardened steel, whereas heretofore satisfactory operation was obtainable only if one of the members, usually the worm, was of a softer metal than the other. Furthermore, due to the fact that the tooth faces on the rollers 28 are at right angles to the axis of the shaft 10, the same worm gear may be employed with either a right or left hand worm and with a worm having any number of threads thereon. Also, the same worm gear may be used with worms having widely varying helix angles.

It will be seen that I have provided a worm gearing wherein sliding friction has been eliminated by the use of rotatable toothed members in the worm gear. Moreover, these members have been mounted for rotation so compactly that it is possible to provide a sufficient number in a gear of even small size so that one member comes into engagement with the worm before the preceding member is disengaged from the worm, thus making continuous rotation possible.

While I have shown and described one more or less specific embodiment of my invention, it is to be understood that this has been done for purposes of illustration only and that the scope of my invention is not to be limited thereby but is to be determined from the appended claims.

What I claim is:

1. In a worm gear, hub means, a plurality of annular rollers rotatably carried by said hub means with the axes of rotation of the rollers tangent to a circle concentric with said hub means, and a tooth formed on the outer periphery of each roller, the radially outer portions of said rollers being sufficiently close together so that the teeth on at least two adjacent rollers may be in engagement simultaneously with a cooperating worm.

2. In a worm gear, hub means adapted to be fixed to a shaft, a plurality of pins carried by said means and extending parallel to the axis of said shaft, a spherical surface on each of said pins, a roller rotatably mounted between each pair of adjacent spherical surfaces, and a tooth formed on the outer periphery of each roller.

3. In a worm gear, hub means, a plurality of annular rollers rotatably carried by said hub means with the axes of rotation of the rollers tangent to a circle concentric with said hub means, and a tooth formed on the outer periphery of each roller, the radially inner portions of adjacent rollers being in rolling contact with each other so that rotation of one roller imparts rotation to an adjacent roller.

4. In a worm gear, hub means, a plurality of annular rollers rotatably carried by said hub means with the axes of rotation of the rollers tangent to a circle concentric with said hub means, and a tooth formed on the outer periphery of each roller, the radially inner portions of adjacent rollers being in rolling contact with each other so that rotation of one roller imparts rotation to an adjacent roller, and the radially outer portions of adjacent rollers being sufficiently close together so that the teeth on at least two adjacent rollers may be in engagement simultaneously with a cooperating worm.

5. In a worm gear, hub means adapted to be fixed to a shaft, a plurality of pins carried by said means and extending parallel to the axis of said shaft, a spherical surface on each of said pins, a plurality of annular rollers, each roller being rotatably mounted between a pair of adjacent spherical surfaces with the axes of rotation of the rollers tangent to a circle concentric with said hub means, and a tooth formed on the outer periphery of each roller, the radially inner portions of adjacent rollers being in rolling contact with each other so that rotation of one roller imparts rotation to an adjacent roller.

6. In a worm gear, hub means adapted to be fixed to a shaft, a plurality of pins carried by said means and extending parallel to the axis of said shaft, a spherical surface on each of said pins, a roller disposed between each pair of adjacent spherical surfaces, a ball bearing between each roller and said adjacent spherical surfaces for rotatably mounting the roller, and a tooth formed on the outer periphery of each roller.

7. In a worm gear, hub means adapted to be fixed to a shaft, a plurality of pins carried by said means and extending parallel to the axis of said shaft, a spherical surface on each of said pins, a roller disposed between each pair of adjacent spherical surfaces, a ball race formed on the inner periphery of each roller, a plurality of bearing balls rotatable in said race and on said adjacent spherical surfaces, and a tooth formed on the outer periphery of each roller.

8. In a worm gear, hub means adapted to be fixed to a shaft, a plurality of pins carried by said means and extending parallel to the axis of said shaft, a spherical surface on each of said pins, a roller rotatably mounted between each pair of adjacent spherical surfaces, adjacent spherical surfaces being in contact with each other whereby force may be transmitted from one pin to another, and a tooth formed on the outer periphery of each roller.

9. In a worm gear, hub means adapted to be fixed to a shaft, a plurality of pins carried by said means and extending parallel to the axis of said shaft, a spherical surface on each of said pins, a plurality of rollers radially disposed with respect to said axis, each roller being rotatably mounted between a pair of adjacent spherical surfaces, adjacent spherical surfaces being in contact with each other whereby force may be transmitted from one pin to another, and a tooth formed on the outer periphery of each roller, the radially inner portions of adjacent rollers being in rolling contact with each other so that rotation of one roller imparts rotation to an adjacent roller.

10. In a worm gear, hub means comprising a pair of axially spaced members adapted to be fixed to a shaft, a plurality of pins extending axially between said members, a spherical surface formed on the central portion of each pin between said members, a roller rotatably mounted between each pair of adjacent spherical surfaces, and a tooth formed on the outer periphery of each roller.

11. In a worm gear, hub means comprising a pair of axially spaced members adapted to be fixed to a shaft, a plurality of pins extending axially between said members, a spherical surface formed on the central portion of each pin between said members, a roller disposed between each pair of adjacent spherical surfaces, a ball bearing between each roller and said adjacent spherical surfaces for rotatably mounting the roller, and a tooth formed on the outer periphery of each roller.

12. In a worm gear, hub means comprising a pair of axially spaced members adapted to be fixed to a shaft, a plurality of pins extending axially between said members, a spherical surface formed on the central portion of each pin between said members, a roller disposed between each pair of adjacent spherical surfaces, a ball bearing between each roller and said adjacent spherical surfaces for rotatably mounting the roller, said adjacent spherical surfaces being in contact with each other within said ball bearing whereby force may be transmitted from one pin to another, and a tooth formed on the outer periphery of each roller.

13. In a worm gear, hub means comprising a pair of axially spaced members adapted to be fixed to a shaft, a plurality of pins extending axially between said members, a spherical surface formed on the central portion of each pin between said members, a radially disposed roller rotatably mounted between each pair of adjacent spherical surfaces, and a tooth formed on the outer periphery of each roller, the radially inner portions of adjacent rollers being in rolling contact with each other so that rotation of one roller imparts rotation to an adjacent roller.

14. In a worm gear, hub means, a plurality of rollers, means for rotatably mounting said rollers in radial positions in said hub with the radially inner portions of adjacent rollers in rolling contact with each other, and a tooth formed on the outer periphery of each roller.

15. In a worm gear, hub means, a plurality of rollers, means for rotatably mounting said rollers in radial positions in said hub with the radially inner portion of each roller in rolling contact with the roller on both sides thereof, and a tooth formed on the outer periphery of each roller.

EMIL ANDERSON.